United States Patent [19]

Christiansen et al.

[11] Patent Number: 4,466,700
[45] Date of Patent: Aug. 21, 1984

[54] LIGHTWEIGHT MIRROR ESPECIALLY FOR ASTRONOMICAL PURPOSES

[75] Inventors: Uwe Christiansen, Gelnhausen; Karlheinz Rau, Hanau; Fritz Simmat, Gelnhausen; Anton Steinkohl, Rothenbergen, all of Fed. Rep. of Germany

[73] Assignee: Heraeus Quarzschmelze GmbH, Hanau, Fed. Rep. of Germany

[21] Appl. No.: 259,733

[22] Filed: May 1, 1981

[30] Foreign Application Priority Data

May 16, 1980 [DE] Fed. Rep. of Germany ....... 3018785

[51] Int. Cl.³ .............................................. G02B 5/08
[52] U.S. Cl. ..................................... 350/310; 350/320
[58] Field of Search ....................... 350/288, 310, 320; 428/116, 118

[56] References Cited

FOREIGN PATENT DOCUMENTS 2161799 7/1973 France ................................. 350/310
739458 6/1980 U.S.S.R. ............................. 350/310

Primary Examiner—F. L. Evans
Attorney, Agent, or Firm—Sprung, Horn, Kramer & Woods

[57] ABSTRACT

The lightweight mirror has a special core construction. The core consists of flat and/or tubular pieces which are joined together by means of a sintering composition. The sintering composition has open pores. In the production of the core, the sintering composition is poured into interstices between pairs of adjacent flat and/or tubular pieces and heated to the sintering temperature in a nonoxidizing atmosphere together with the flat and/or tubular pieces. A layer of sintering composition can be provided on the faces of the front and/or back plate of the lightweight mirror which confront the core. Stiffening rods can be embedded in the sintering composition.

13 Claims, 9 Drawing Figures

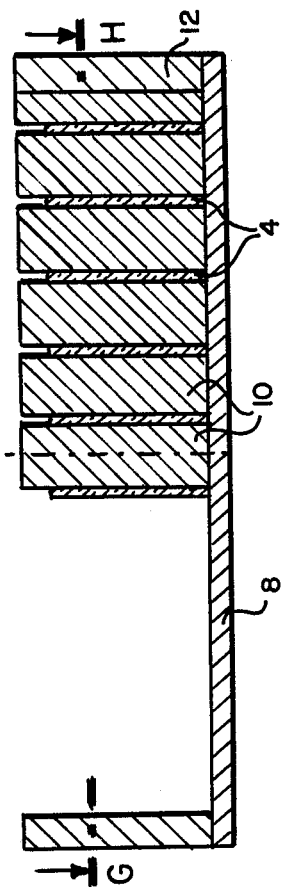
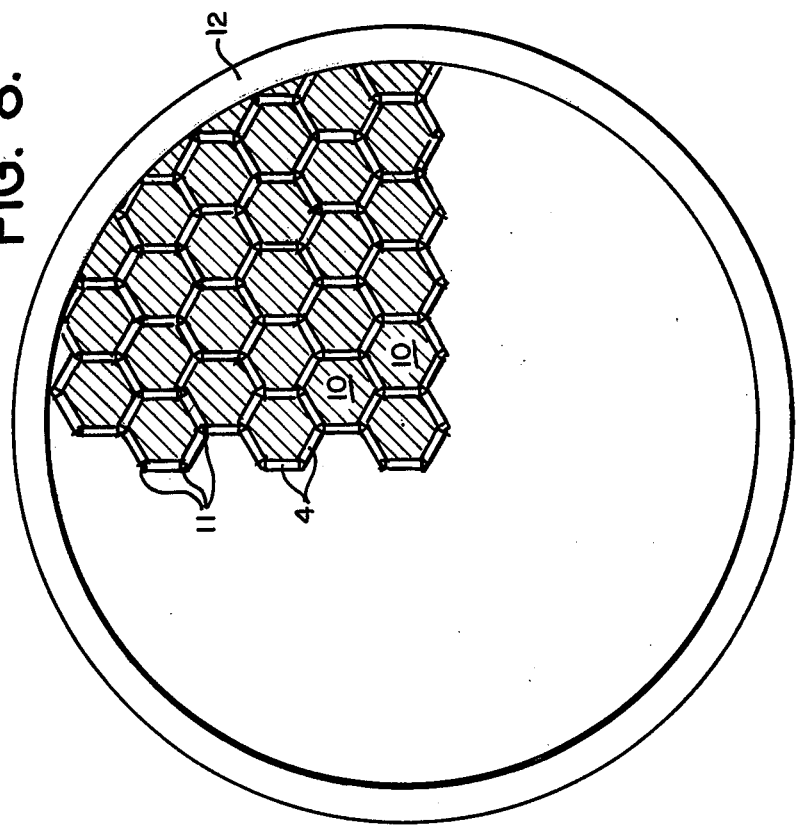
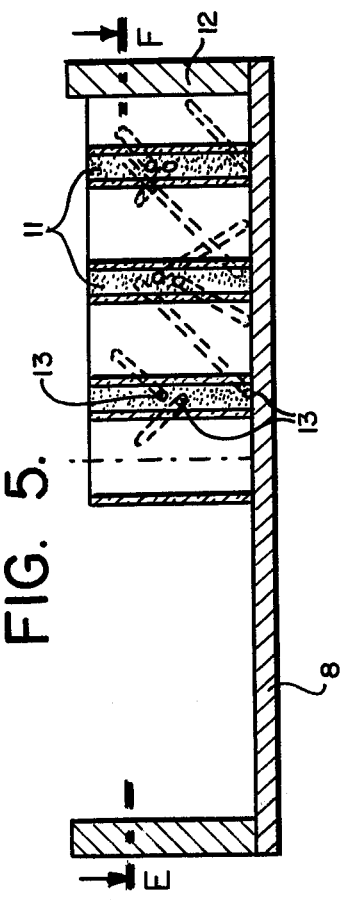
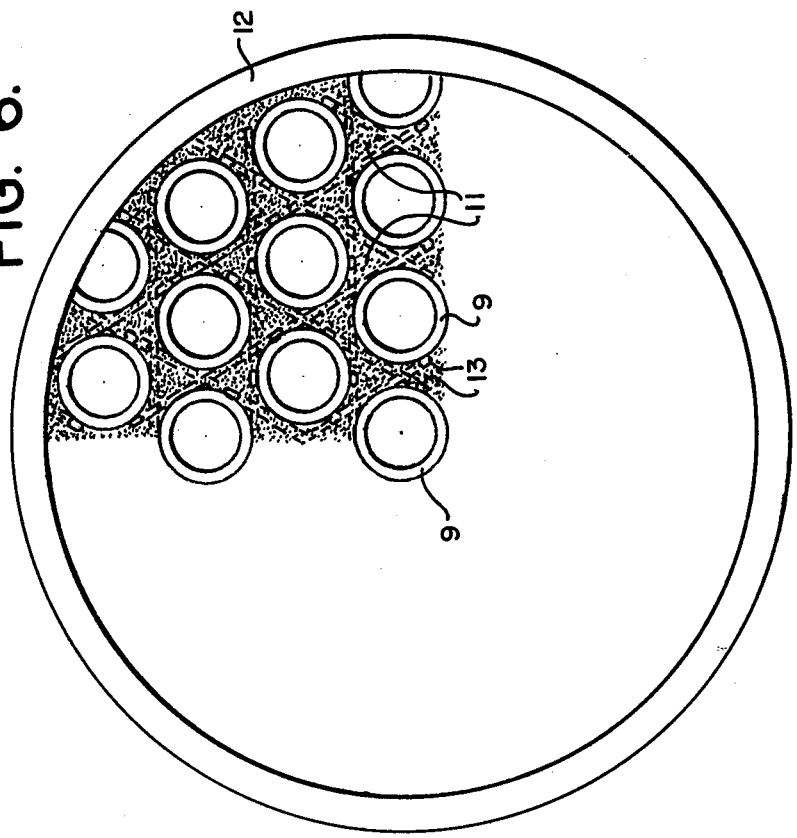

LIGHTWEIGHT MIRROR ESPECIALLY FOR ASTRONOMICAL PURPOSES

BACKGROUND OF THE INVENTION

1. Field of the Invention

The invention relates to a lightweight mirror, especially for astronomical purposes, which has a core of clear or opaque vitreous silica or high-silica glass fixedly bonded between a front plate of clear vitreous silica or high-silica glass and a back plate of clear or opaque vitreous silica or high-silica glass, the materials selected for the plates and the core having equal coefficients of thermal expansion, and it relates also to a method of making such a lightweight mirror.

2. Discussion of Prior Art

U.S. Pat. No. 2,988,959 discloses a lightweight mirror in sandwich form, which consists of a front plate and a back plate disposed at a distance therefrom, which are joined fixedly together by sections of tubing in a spaced relationship to one another. The section of tubing form the core of the mirror. Glass is used as the material for the front plate, the back plate and the tubing sections. For the construction of the mirror, the tubing sections are joined by means of a bonding agent to the one plate and then, in the same manner, to the other plate. These known mirror are simple in their construction, but they do not have sufficient rigidity against forces acting parallel to the back plate.

GB Pat. No. 1,167,895 discloses lightweight mirrors in which the front plate and the back plate are joined together by a core which consists either of tubing sections or of spacing members of cruciform cross section. Instead of the named tubing sections or spacers of cruciform cross section, spacers can also be used which consist of interlocking strips in a kind of "egg crate" construction. These lightweight mirrors consist of thermally devitrified glass (glass ceramic) which has a $SiO_2$ content of up to 70% by weight and whose other principal components are $Li_2O$ and $Al_2O_3$. Instead of this thermally devitrified glass, high-silica glasses (glasses having a $SiO_2$ content of a least 90% by weight, whose thermal expansion coefficient has been adjusted by the addition of doping agents, such as $TiO_2$, to a value that a equal to or even smaller than the thermal expansion coefficient of vitreous silica) have been used in producing such lightweight mirrors. Such mirrors are being marketed (prospectus, "Low Expansion Materials" of Corning Glass Works, Corning, N.Y., U.S.A. 1969).

For the improvement of transverse stability, lightweight mirrors are described in GB Pat. No. 1,126,930, in which the core consists of a plate provided with through bores. Clear vitreous silica is used as the material for the mirror plate and opaque vitreous silica for the core of these lightweight mirrors. The back plate consists also of vitreous or opaque vitreous silica.

U.S. Pat. No. 3,644,022 makes known lightweight mirrors in which the core is formed of Y-shaped components which are welded together to form a honeycomb-like core framework of high rigidity. Silicon dioxide-containing material is used as the substance for these mirrors.

The lightweight mirror designs described in the last-named disclosure do have the desired adequate rigidity, especially rigidity against forces acting parallel to the back plate, but their production is exceedingly laborious and involves great risks of providing a flawed product. This becomes clear if one considers that cracks can be produced by the drilling of the holes or in the welding together of the components forming the core.

SUMMARY OF THE INVENTION

It is an object of the invention, therefore, to provide a lightweight mirror of high rigidity even against transverse forces, which mirror can easily and economically be manufactured, and to a method of constructing a core, free of the above-described deficiencies of the methods of the prior art.

This object is achieved according to the invention in a lightweight mirror of the kind defined above, when the core consists of flat and/or tubular pieces which are bonded together fixedly by means of a sintering composition to form hollow spaces, the sintering composition comprising, on the one hand, the same material as the flat and/or tubular parts, and being composed, on the other hand, of granules, small tubes, rods, flakes, or a mixture thereof, and having a density less than that of vitreous silica or high-silica glass.

Additional advantageous features of the lightweight mirror of the invention will appear in the ensuing disclosure and claims and in the embodiments represented in the drawings.

The method of producing lightweight mirrors in accordance with the invention, is preferably performed by constructing the core by setting up flat and/or tubular pieces of transparent or opaque vitreous silica or high-silica glass on a support plate, filling in the space remaining between pairs of adjacent pieces with a sinterable composition of granules, small tubes, rods, flakes or a mixture thereof, and holding this assembly to the sintering temperature in a furnace while maintaining a nonoxidizing atmosphere, and, after cooling the same, removing the graphite ring and the support plate, and fixedly joining the core thus obtained to the front plate and the back plate, such as in known manner.

By the above described process there is provided a lightweight mirror comprising a front plate of clear vitreous silica or high-silica glass and a back plate of clear or opaque vitreous silica or high-silica glass between which there is disposed a core of clear or opaque vitreous silica or high-silica glass which is fixedly joined to said front and back plates. The core comprises flat and/or tubular pieces which can run in a plane generally normal to the plane of said front and back plates. The core comprises said flat and/or tubular pieces which, in accordance with the invention, are fixedly joined to one another by a sintered sintering composition whereby to define a cavity. The sintered sintering composition is one which in its unsintered form is made of the same material as the flat and/or tubular pieces which run generally normal to the plane of the front and back pieces. The sintering material is in the form of granuales, small tubes, rods, flakes or a mixture thereof and in its unsintered form has a density less than that of vitreous silica or high-silica glass, as the case may be.

Preferably, the sintering composition employed has open pores and a density ranging from 0.2 to 1.8 grams per cubic centimeter. When employed it is preferred that there be inserted or imbedded through the sintering composition a plurality of stiffening rods which preferably are disposed in the unsintered composition slantingly so as to form an angle ranging between 30° and 60° from the vertical. When the sintering composition is sintered, the sintering rods will remain disposed at such angle.

Preferably, the mirror of the invention is one in which the front and/or back plate has on its surface facing the core a layer of sintered sintering material which can also be in the form of granuales, small tubes, rods, flakes or a mixture thereof. This sintering material can be the same material used to fixedly join the flat and/or tubular pieces comprising the core of the mirror. The layer of sintering material will generally be between 0.2 and 5.5 mm thick in the unsintered state. When sintered during formation of the mirror, this layer achieves a final thickness of between 0.2 and 5.0 mm. It is preferred that both the front and back plates of the mirror contain on the surface facing the core such sintering composition.

The sintering composition is, therefore, composed of clear or opaque vitreous silica or high-silica glass. In the unsintered form, the particles thereof generally have a maximum dimension no greater than mm. In granular form, the particles of the sintering composition have a maximum dimension of between 0.05 and 2.0 mm, preferably between 0.2 and 0.8 mm. In rod form the particles of the sintering composition generally do not have a particle size greater than 10 mm in the longitudinal direction and 2.0 mm in the cross sectional direction. In the form of flakes, the particles generally have a thickness no greater than 0.5 mm and a maximum dimension across the plane of the flake of 2.0 mm, preferably between 0.5 and 1.2 mm.

When the mirror is being constructed the sintering composition is disposed within the interstices between the shaking for a period of a few minutes and by flat and/or tubular pieces and is preferably compacted per sq.cm by the application of pressure of at least 0.05 kiloponds, per sq.cm preferably between 0.1 and 0.2 kiloponds, to insure intimate contact of the particles of the sintering composition. Thereafter, sintering is effected such as by subjecting the sintering composition to a temperature of between 1100° C. and 1800° C., preferably between 1,300° and 1,600° C. Sintering is effected for a period of time at least sufficient to insure that virtually all of the composition is sintered to fixedly join the juxtaposed flat and/or tubular materials to one another to define the cavity. The sintering is effected in a non-oxidizing atmosphere, such as an atmosphere comprising nitrogen. Other non-oxidizing atmospheres can be employed such as those containing hydrogen, ammonia, inert gases and vacuum. Sintering is effected at atmospheric pressure although subatmospheric and superatmospheric pressures can be maintained in the furnace especially when large quantities of non-oxidizing gas are admitted to the furnace chamber. Hence, sintering can be effected at temperatures as a low as 1 Torr and as high as 10 atmospheres.

When the sintering composition employed in accordance with the invention is a sintering composition of high-silica glass, the glass generally has a silica content of at least 85% by weight, preferably at least 90% by weight. The term "high-silica glass" is generally understood to mean a glass whose silica context is at least 85% by weight.

BRIEF DESCRIPTION OF DRAWINGS

Lightweight mirrors and their construction pursuant to the invention will be described with the aid of FIGS. 1 to 9, wherein:

FIG. 5 is a vertical cross section through an assembly for the creation of a lightweight mirror according to the invention;

FIG. 6 is a detail of a horizontal cross section through the assembly of FIG. 3, in the plane E-F;

FIG. 7 is a vertical cross section through an assembly for the creation of the core for a lightweight mirror according to the invention;

FIG. 8 is a detail of a horizontal cross section through the assembly of FIG. 3, in the plane G-H;

DESCRIPTION OF SPECIFIC EMBODIMENTS

Figure 1:
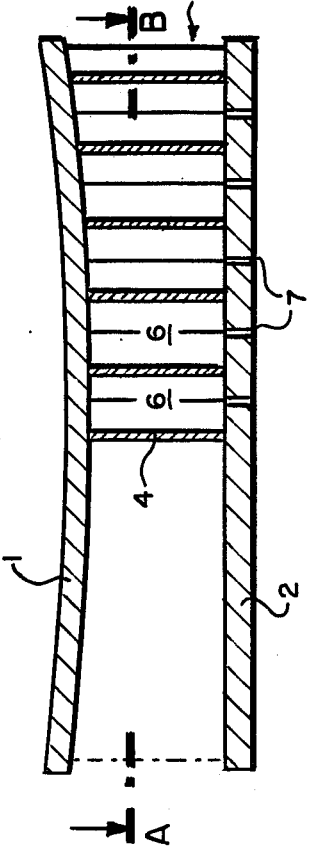
FIG. 1 is a vertical cross section through a lightweight mirror in accordance with the invention.
Figure 2:
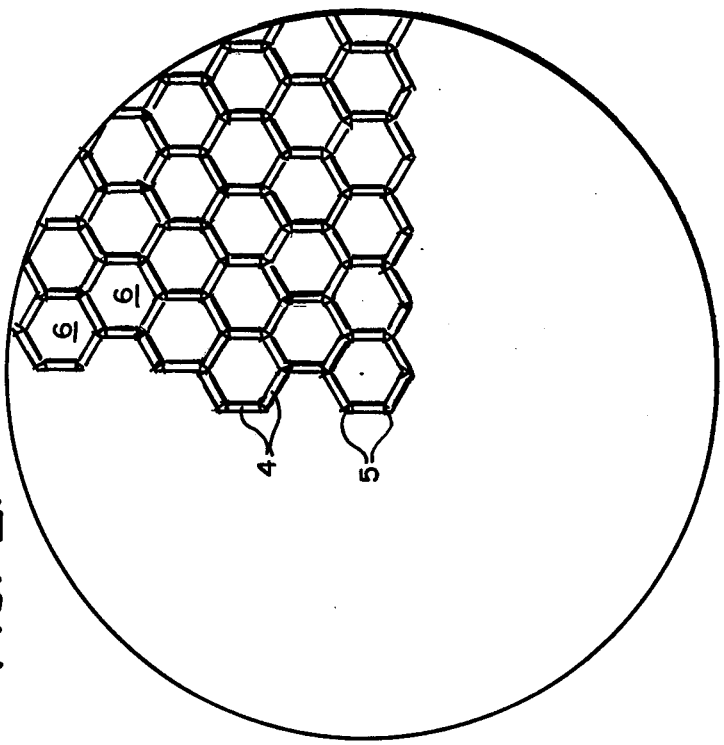
FIG. 2 is a horizontal cross section through the core of the mirror of FIG. 1, taken along plane A-B.

As seen in FIG. 1, the lightweight mirror of the invention consists of a front plate 1 and a back plate 2, which are joined fixedly together by a core 3. As seen in FIG. 2, the core 3 consists of flat pieces 4 which are joined together by the sintering compositions 5 (FIG. 2) and form hollow spaces 6 for the purpose of keeping the weight of the mirror as small as possible. The cross-sectional shape of the hollow space 6 is polygonal, being hexagonal in the present example. It has been found advantageous to provide the back plate 2 with the vent holes 7, as indicated in FIG. 1. In the present example, the front plate 1 is made of clear vitreous silica and the back plate of opaque vitreous silica. The flat pieces 4 of the core also made of transparent vitreous silica and the sintering composition 5 consists of vitreous silica particles. Similarly, high-silica glass as defined hereinabove can be used as the material of the front plate, back plate, flat pieces and sintering composition.

The production of a core for a lightweight mirror will now be described in conjunction with FIGS. 3 and 4. On a support plate 8, consisting for example, of graphite or a plate of refractory material overlaid with graphite (support plate having a carbonaceous surface layer), tubular pieces 9 of vitreous silica are arranged around graphite pieces 10, and the interstices are filled up with the sintering composition 11, which as shown runs generally normal to the support plate 8 and within the interstices between the tubular pieces 9 and the graphite pieces 10.

The graphite pieces 10 and the tubular pieces 9 set up on the support plate are held tightly together along with the sintering composition 11 by means of a graphite ring 12. This assembly is then placed in a furnace in which a nonoxidizing atmosphere is maintained while the assembly is heated to the sintering temperature. When the tubular pieces 9 consist of vitreous silica and the particles of the sintering composition 11 also consist of vitreous silica, the abovedescribed assembly is heated in the furnace for a period of time ranging from 2 to 6 hours at a temperature ranging from 1300° to 1600° C. During this heating process, the vitreous silica particles of the composition 11 fuse not only to one another but also to the tubular pieces 9. After the heating process is ended, the assembly is let cool in the furnace while sustaining a nonoxidizing atmosphere, and then the graphite bodies 10 and the graphite ring 12 are removed and the resulting core is removed from the support plate. The top and bottom surface of the core are provided with the desired surface curvature by mechanical methods, such as grinding for example. Then this core is bonded to the front plate and back plate in a known manner, for example by directed heating by electric arc as known from U.S. Pat. No. 3,754,812 (FIG. 7), to form a lightweight mirror.

Figure 3:
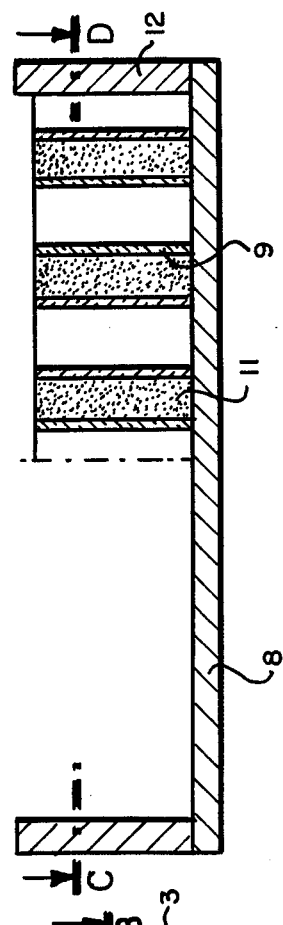
FIG. 3 is a vertical cross section through an assembly for producing the core of a lightweight mirror according to the invention.
Figure 4:
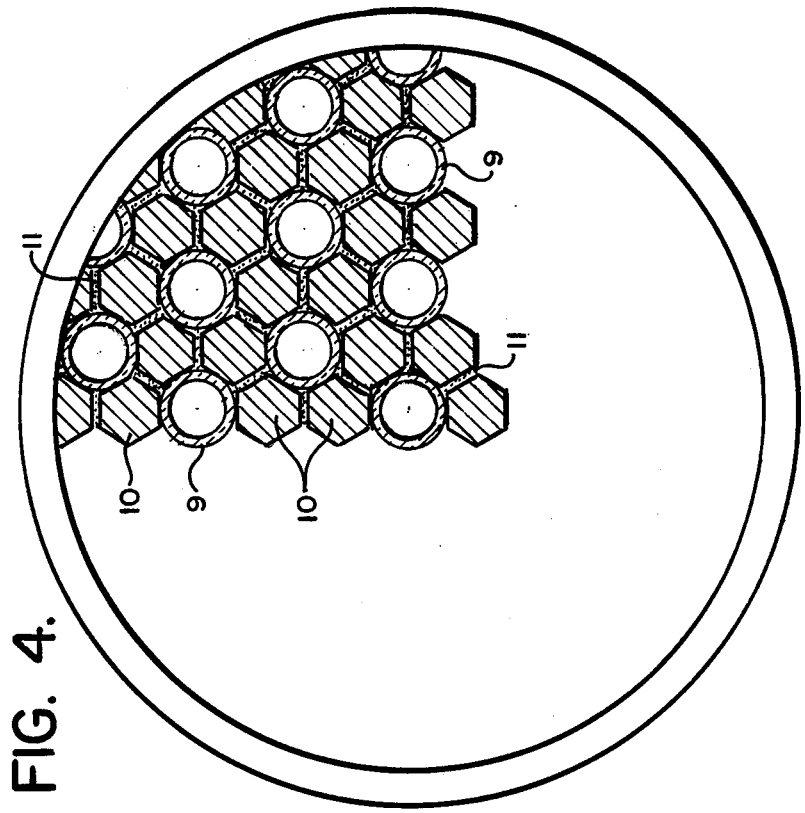
FIG. 4 is a detail of a horizontal cross section through the assembly shown in FIG. 3, in the plane C-D.

The embodiment represented in FIGS. 5 and 6 differ from that represented in FIGS. 3 and 4 in that no graphite bodies 10 are used, and instead the interstices between the tubular pieces are completely filled with sintering composition. To increase the rigidity of the core, stiffening rods 13 are incorporated into the sintering composition 11 at an angle ranging from 30° to 60° from the vertical. The assembly represented in FIG. 5 is then treated in the same way as described in conjunction with FIGS. 3 and 4, for the formation of the core.

FIGS. 7 and 8 represent a system similar to that described in conjunction with FIGS. 3 and 4. Instead of the tubular pieces, flat pieces 4 are set up around graphite pieces 10 of hexagonal cross section and the empty spaces are filled up with sintering composition 11. The core is then finished in exactly the same manner as described in conjunction with FIGS. 3 and 4. After the core thus prepared is bonded to the front plate 1 and the back plate 2, the result is a lightweight mirror as represented in FIGS. 1 and 2.

Figure 9:
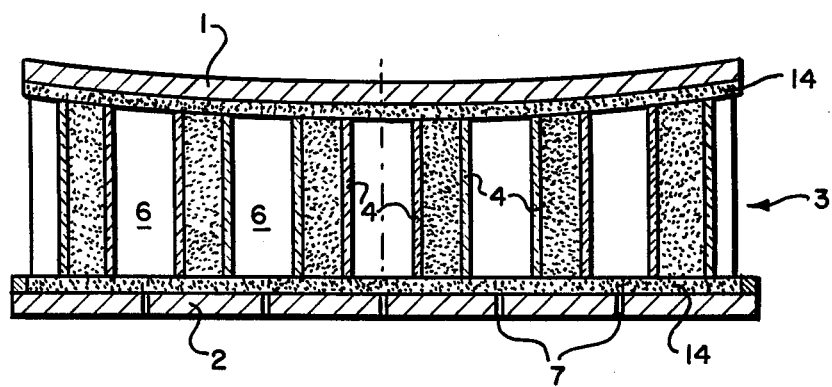
FIG. 9 is a vertical cross section through a lightweight mirror of the invention.

FIG. 9 shows a lightweight mirror in accordance with the invention which has the same structure as that represented in FIG. 1, but with the difference that the faces of the front plate 1 and of back plate 2 confronting the core are provided with a sintering layer 14. The bonding of the front plate 1 and the back plate 2 to the core 3 by the sintering layer 14 is best accomplished by applying the sintering composition 11 to the back plate 2 in a thickness ranging from 0.5 to 10 mm, placing the core on this sintering composition, and then heating this assembly to the sintering temperature in a furnace. After cooling, the bond between the core and the front plate is produced in a similar manner. For this purpose the assembly consisting of back plate 2 and core 3 is disposed on a layer of sintering composition applied to the front plate 1, and this entire assembly is then heated to the sintering temperature in a furnace to produce the bond between front plate and core.

As it can be seen from the description of the figures, the core of lightweight mirrors of the invention, and hence the lightweight mirrors themselves, can be produced in a simple manner from simple components and, therefore, economically, without the danger of cracking in the production of the core.

What is claimed is:

1. In a lightweight mirror, especially for astronomical purposes, having a front plate of clear vitreous silica or high-silica glass, a back plate of clear or opaque vitreous silica or high-silica glass and between said front plate and said back plate a core of clear or opaque vitreous silica or high-silica glass fixedly joined to these plates, a plurality of pieces disposed within said core and running in a plane generally normal to the plane of the front plate and the back plate, the materials selected for the front and back plates and the core having equal thermal expansion coefficients, the improvement wherein said pieces of said core are fixedly joined together by a sintered sintering composition to define a plurality of cavities, said sintering composition comprising, the same material as the pieces, and comprising granules, small tubes, rods, flakes or a mixture thereof, said sintering composition having a density less than that of vitreous silica or high-silica glass, as the case may be.

2. A mirror of claim 1, wherein said sintering composition has open pores and has a density ranging from 0.2 to 1.8 g/cm$^3$ in the unsintered state.

3. A mirror of claim 1, wherein at least one stiffening rod is embedded in the sintered composition.

4. A mirror of claim 3, wherein said stiffening rod is arranged slantingly in the sintered sintering composition, forming an angle ranging between 30° and 60° from the vertical.

5. A mirror of claim 1, wherein the front plate and/or the back plate has on their surface facing said core a sintered sintering layer which is formed of granules, small tubes, rods, flakes or a mixture thereof.

6. A mirror of claim 1, wherein said cavities viewed in cross section are polygonal in shape.

7. A mirror according to claim 6, wherein said polygonal shape is hexagonal.

8. A mirror according to claim 1, wherein said pieces are flat pieces.

9. A mirror according to claim 1, wherein said pieces are tubular pieces.

10. A mirror according to claim 1, wherein said sintering composition in granular form has granular particles with a maximum dimension of between 0.05 and 2.0 mm.

11. A mirror according to claim 1, wherein said sintering composition in rod form has rod particles with a particle size of no greater than 10 mm in the longitudinal direction and 2.0 mm in the cross-sectional direction.

12. A mirror according to claim 1, wherein said sintering composition in flake form has flake particles with a thickness no greater than 0.5 mm and a maximum dimension across the flake of 2.0 mm.

13. A mirror according to claim 1, wherein said back plate has one or more vent holes therethrough.

* * * * *